United States Patent
Chang et al.

(10) Patent No.: US 9,152,290 B2
(45) Date of Patent: Oct. 6, 2015

(54) TOUCH-SCREEN SYSTEM AND DISPLAY PANEL WITH TOUCH-SENSING FUNCTION

(71) Applicant: AU Optronics Corporation, Hsin-Chu (TW)

(72) Inventors: Chia-Wei Chang, Hsin-Chu (TW); Yu-Jung Liu, Hsin-Chu (TW); Chih-Che Kuo, Hsin-Chu (TW); Tokuro Ozawa, Nagano (JP); Koji Aoki, Chiba (JP)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 14/192,564

(22) Filed: Feb. 27, 2014

(65) Prior Publication Data

US 2015/0015536 A1    Jan. 15, 2015

(30) Foreign Application Priority Data

Jul. 15, 2013   (TW) .............................. 102125242 A

(51) Int. Cl.
*G06F 3/046* (2006.01)
*G06F 3/041* (2006.01)

(52) U.S. Cl.
CPC .............. *G06F 3/046* (2013.01); *G06F 3/0412* (2013.01)

(58) Field of Classification Search
CPC . G06K 2209/01; G06K 9/222; G06K 9/2054; G06F 3/0416; G06F 3/04883; G06F 3/03545; G06F 3/046; G06F 3/03546; G06F 3/0412
See application file for complete search history.

(56) References Cited

U.S. PATENT DOCUMENTS

| | | | |
|---|---|---|---|
| 3,466,646 A | 9/1969 | Lewin et al. | |
| 2014/0240266 A1* | 8/2014 | Rekimoto | 345/173 |

FOREIGN PATENT DOCUMENTS

| | | |
|---|---|---|
| CN | 101403954 | 4/2009 |
| EP | 2224693 A1 | 9/2010 |
| JP | 2007187656 A | 7/2007 |

* cited by examiner

*Primary Examiner* — Abbas Abdulselam
(74) *Attorney, Agent, or Firm* — WPAT, PC; Justin King

(57) ABSTRACT

A touch-screen system including a stylus, a display panel and a touch module is disclosed herein. The stylus includes a magnetic component. The touch-sensing module is disposed within the display panel. The touch-sensing module includes a plurality of sensing units distributed at different locations as an array over the display panel. Each of the sensing units includes a Hall induction plate for sensing a magnetic field established by the magnetic component and forming an induction output voltage. The touch module detects a touch position of the stylus according to the induction output voltages from the sensing units.

11 Claims, 8 Drawing Sheets

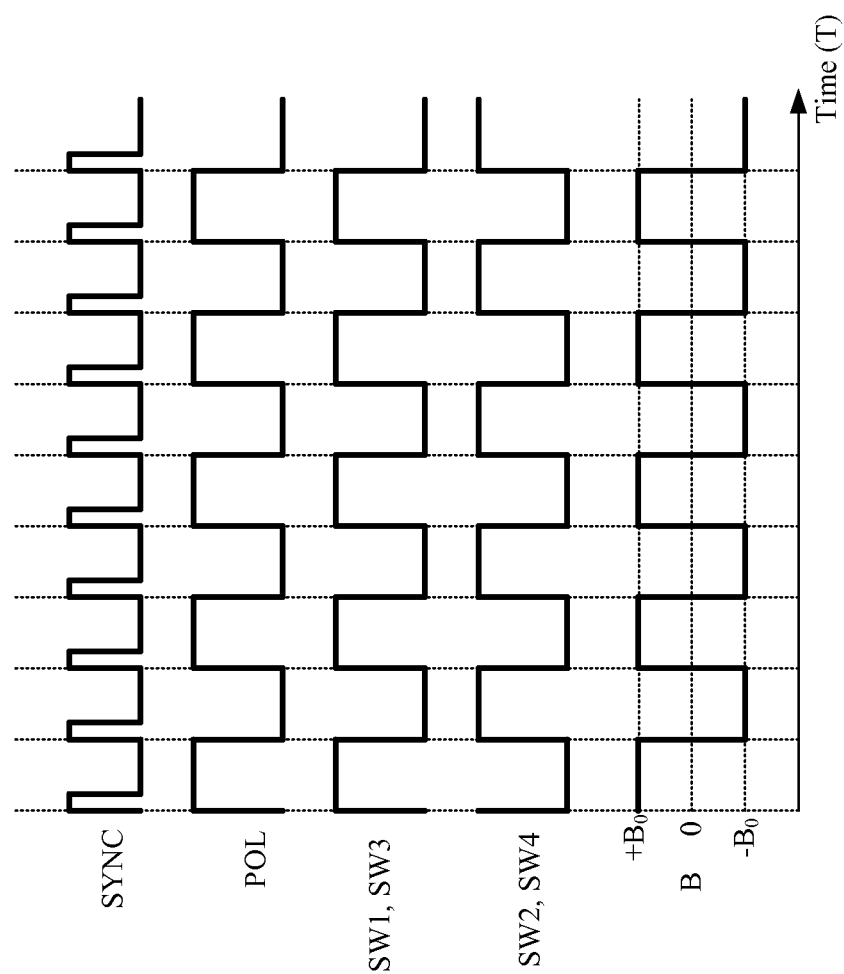

TOUCH-SCREEN SYSTEM AND DISPLAY PANEL WITH TOUCH-SENSING FUNCTION

RELATED APPLICATIONS

This application claims priority to Taiwan Patent Application Serial Number 102125242, filed Jul. 15, 2013, which is herein incorporated by reference.

FIELD OF INVENTION

The invention relates to a touch-screen. More particularly, the invention relates to a touch-screen system in which a touch-sensing function is integrated into a display panel.

BACKGROUND

A conventional touch-screen is usually implemented by attaching a transparent touch-sensing module onto a display panel, so as to realize function of touch-sensing and displaying at the same time. With speedy development in the touch-sensing hardware and the sensitivity thereof, touch-input interfaces are now widely utilized in various applications, and gradually replace traditional input devices, such as keyboard and mouse.

There are various types of touch-screen technology, which have been manufactured or under development, such as resistive type, surface acoustic wave type, surface capacitance type, projected capacitance type, infrared type, optical imaging type, Electro Magnetic Resonance (EMR) type, etc. A conventional touch-sensing module is independent from the display panel. A sensing layer for touch-sensing is additionally adhered onto a surface of the display panel, such that a total thickness of the touch-screen will be larger.

In an example of an EMR sensing manner, a magnetic component of a stylus is utilized to establish a magnetic field, and a touch panel is required to implement a corresponding magnetic sensing coil in addition. The magnetic sensing coil is utilized to sense variances of the magnetic field on the panel, so as to acknowledge a touch position of the stylus. The additional magnetic sensing coil will increase the thickness of the panel, and it is against a design goal of slimming down the display panels.

SUMMARY

An aspect of the disclosure is to provide a touch-screen system, which includes a stylus, a display panel and a touch module. The stylus includes a magnetic component. The touch module is disposed within the display panel. The touch module includes sensing units distributed at different positions in an array arrangement on the display panel. Each of the sensing units includes a Hall induction plate for sensing a magnetic field established by the magnetic component and forming an induction output voltage respectively. The touch module detects a touch position of the stylus according to the induction output voltages.

Another aspect of the disclosure is to provide a display panel with touch-sensing function. The display panel is capable of detecting a touch position of a stylus. The stylus includes a magnetic component. The display panel includes a display-driving circuit layer and a touch module. The touch module is integrated within the display-driving circuit layer. The touch module includes sensing units distributed at different positions in an array arrangement on the display panel. Each of the sensing units includes a Hall induction plate for sensing a magnetic field established by the magnetic component and forming an induction output voltage respectively. The touch module detects a touch position of the stylus according to the induction output voltages.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4C is a signal waveform illustrating relative signals of the differential comparison circuit and the stylus shown in FIG. 4A and FIG. 4B;

DETAILED DESCRIPTION

Figure 1:
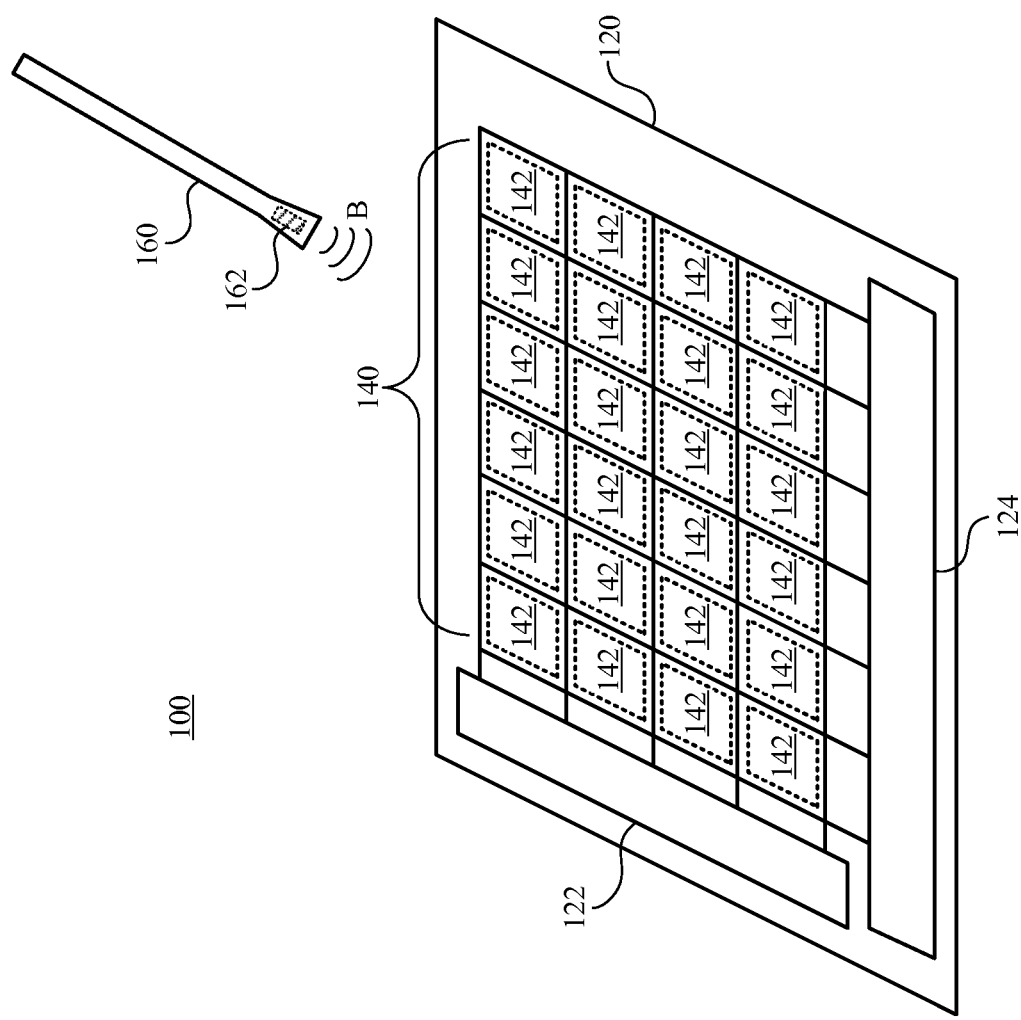
FIG. 1 is a schematic diagram illustrating a touch-screen system according to an embodiment of this disclosure.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Reference is made to FIG. 1, which is a schematic diagram illustrating a touch-screen system 100 according to an embodiment of this disclosure. As shown in figure, the touch-screen system 100 includes a stylus 160, a display panel 120 and a touch module 140 disposed within the display panel 120.

For example, in the embodiment shown in FIG. 1, the display panel 120 includes a gate driving circuit 122 and a data driving circuit 124, which are basic components for realizing displaying function. In addition, the display panel 120 includes multiple pixels, which are distributed at different positions in an array (or matrix) arrangement on the display panel 120. Basic structures of the display panel are well known by a person in the art, and not to be further explained herein.

In this embodiment, the touch module 140 includes sensing units 142. The sensing units 142 are distributed at different positions in an array (or matrix) arrangement on the display panel 120. For example, each of the sensing units 142 is disposed corresponding to each of the pixels on the display panel 120 (as shown in FIG. 1), but the disclosure is not limited to this 1-to-1 mapping.

In other embodiments, the sensing units 142 can be disposed by a given interval (one sensing units 142 is disposed every M rows or every N column, in which M, N are positive integers, not shown in figure), or the sensing units 142 can be arranged along with sub-pixels of different colors (e.g., one sensing unit 142 is disposed corresponding to three sub-pixels with Red, Green and Blue colors, not shown in figure). In practical applications, a density of the sensing units 142 can be adjusted according to cost/complexity of manufacturing and requirements of touch sensitivity/accuracy.

In this embodiment, the stylus includes a magnetic component 162. The magnetic component 162 is utilized to establish a magnetic field B. Each of the sensing units 142 of the touch module 140 includes a Hall induction plate (not illustrated in FIG. 1) for sensing the magnetic field B established by the magnetic component 162. Each of the sensing units 142 generates an induction output voltage according to a sensed variance of the magnetic field B on their own. Therefore, the touch module 140 detects a touch position of the stylus 160 according to the induction output voltages generated from the sensing units 142. Details of sensing behaviors are disclosed in following paragraphs.

Figure 2:
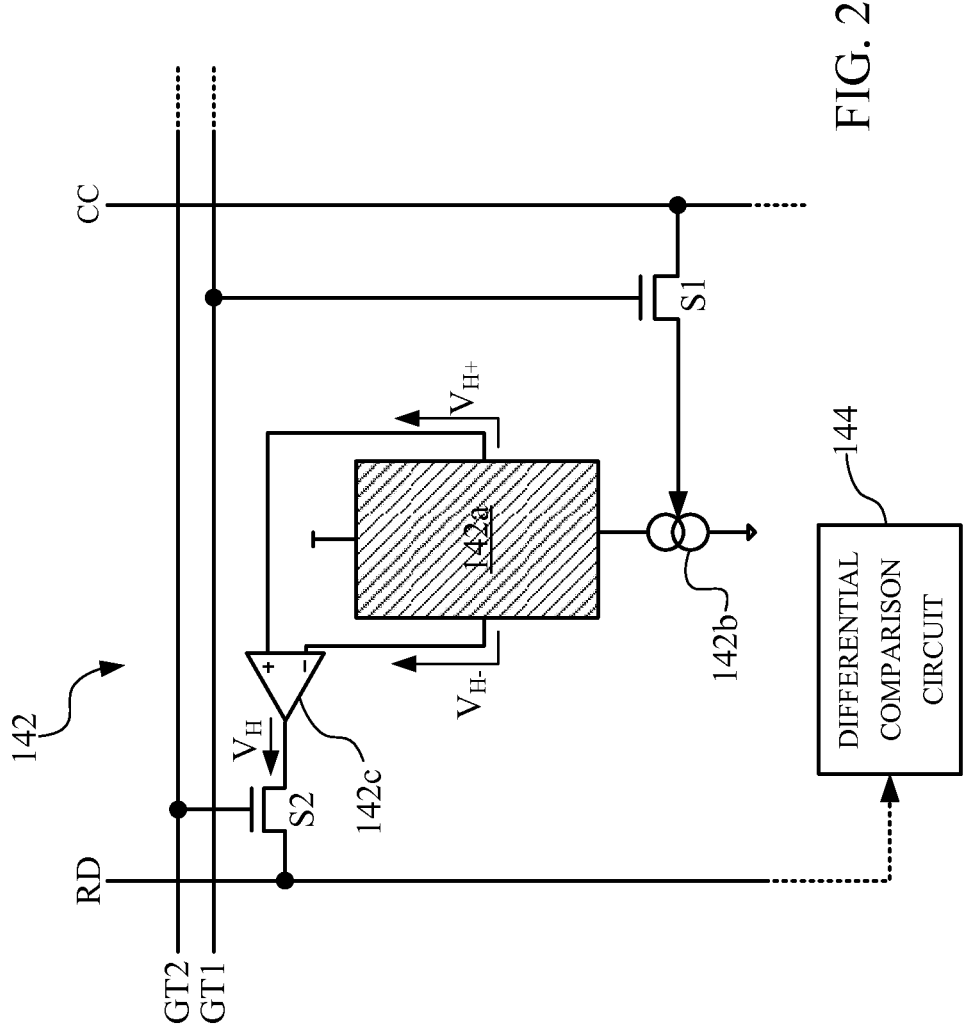
FIG. 2 is a schematic diagram illustrating one of each sensing unit within a touch module.
Figure 3:
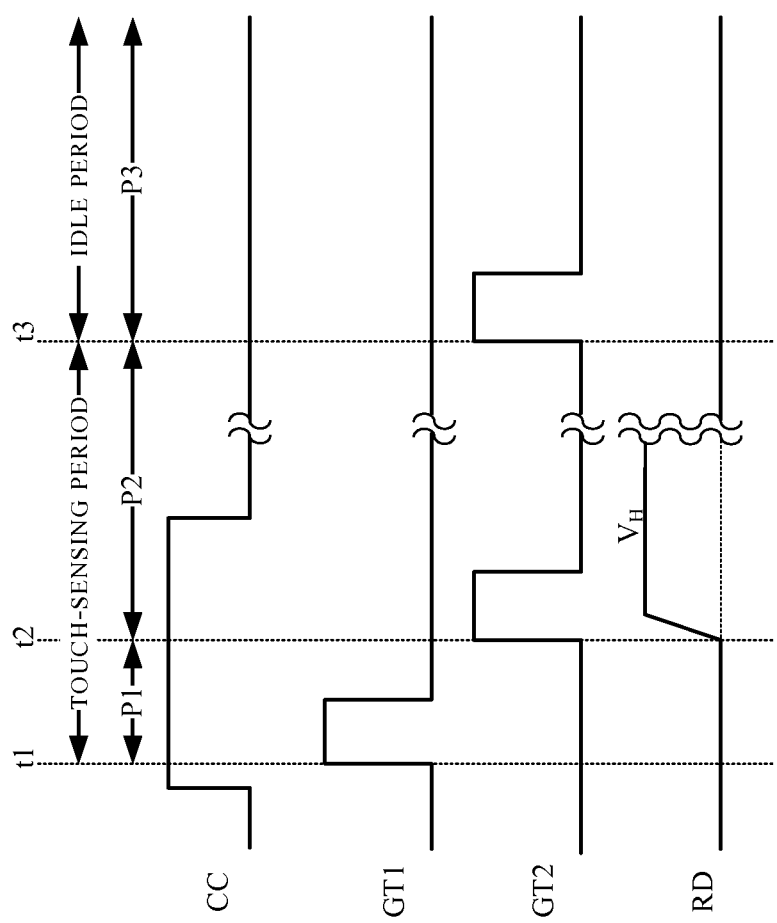
FIG. 3 is a signal waveform illustrating relative signals of the sensing unit shown in FIG. 2.

Reference is further made to FIG. 2 and FIG. 3. FIG. 2 is a schematic diagram illustrating one of each sensing unit 142 within the touch module 140. FIG. 3 is a signal waveform illustrating relative signals of the sensing unit 142 shown in FIG. 2.

As shown in FIG. 2, each sensing unit 142 includes a Hall induction plate 142a, a power signal source 142b, a signal amplifier 142c, a first switch S1 and a second switch S2 in this embodiment.

The first switch S1 is coupled between the power signal source 142b and the Hall induction plate 142a. The second switch S2 is coupled between the Hall induction plate 142a and the signal amplifier 142c.

As shown in FIG. 3, a touch-sensing period includes a first time interval P1 and a second time interval P2. During the first time interval P1, the first switch S1 is conducted according to the gate signal GT1. The power control signal CC is set at high level and configured for driving the power signal source 142b through the first switch S1, such that the power signal source 142b is activated to provide plural free charges to the Hall induction plate 142a.

As shown in FIG. 2, when the free charges provided by the power signal source 142b enters the Hall induction plates 142a, the free charges are affected by the magnetic field B established by the magnetic component 162 on the stylus 160, such as to form an induction voltage difference (i.e., the voltage difference between the voltage levels $V_{H+}$ and $V_{H-}$). The induction voltage difference is processed by the signal amplifier 142c to form the induction output voltage $V_H$.

During the second time interval P2, the second switch S2 is conducted according to another gate signal GT2, so as to output the induction output voltage $V_H$ to a reading line (e.g., the reading signal RD shown in FIG. 2 and FIG. 3).

On the other hand, during a third time interval within an idle period, the power control signal CC is switched to low level, such that the power signal source 142b is deactivated and stops providing charges to the Hall induction plate 142a.

In practical applications, the stylus 160 is located at different relative distances (relative locations) from each of the sensing units 142 within the touch module 140. In this case, the magnetic field B established by the magnetic component 162 is different in magnitude and direction in view of each of the Hall induction plates 142a on the sensing units 142. Therefore, each of the sensing units 142 forms the induction output voltage $V_H$ different from each other according to the sensed variance of the magnetic field B on their own.

A touch sensing circuit can read the induction output voltages $V_H$ fed back from each of the sensing units 142 through the reading signals RD, and detects the touch position of the stylus 160 accordingly.

Figure 4A:
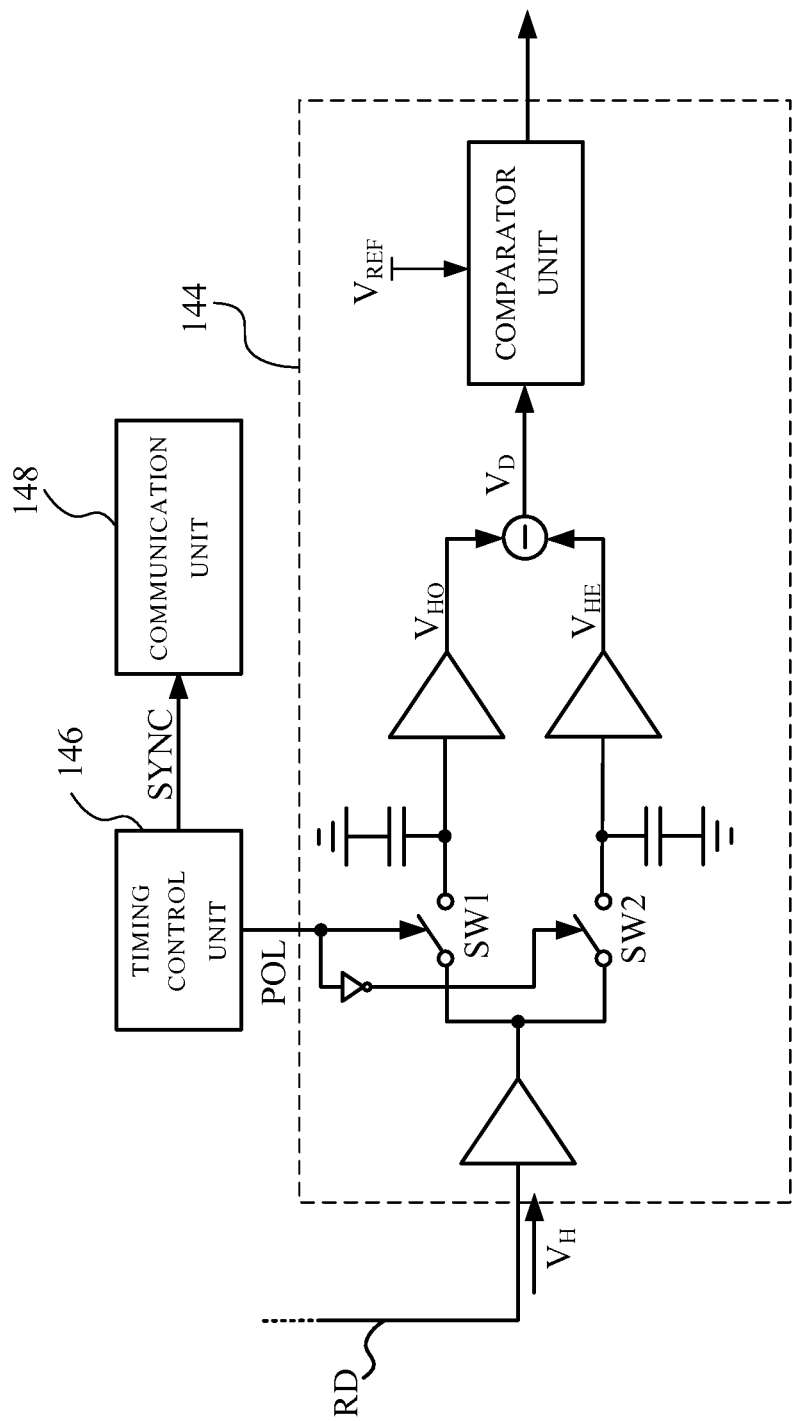
FIG. 4A is a schematic diagram illustrating a differential comparison circuit of the touch module according to an embodiment of the disclosure.
Figure 4B:
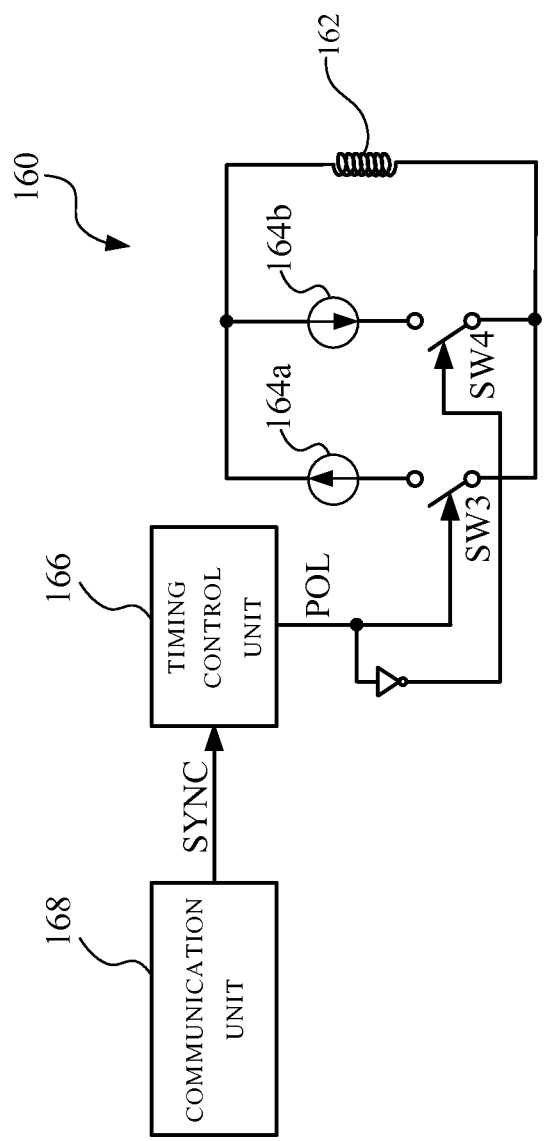
FIG. 4B is a schematic diagram illustrating a stylus corresponding to the embodiment shown in FIG. 4A.

In order to improve the accuracy of touch-sensing, an embodiment of this disclosure further provides a manner to form/detect/determine the induction output voltages $V_H$ in a differential way. As the embodiment shown in FIG. 3, the touch module 140 further includes a differential comparison circuit 144, which is configured to read the induction output voltages $V_H$ fed back through the reading signals RD. Reference is further made to FIG. 4A, FIG. 4B and FIG. 4C. FIG. 4A is a schematic diagram illustrating the differential comparison circuit 144 of the touch module 100 according to an embodiment of the disclosure. FIG. 4B is a schematic diagram illustrating the stylus 160 corresponding to the embodiment shown in FIG. 4A. FIG. 4C is a signal waveform illustrating relative signals of the differential comparison circuit 144 and the stylus 160 shown in FIG. 4A and FIG. 4B.

As shown in FIG. 4B, the magnetic component 162 in this embodiment includes an electromagnetic induction coil. The stylus further includes a switching module (which includes switches SW3 and SW4 in this embodiment) coupled with the electromagnetic induction coil (i.e., the magnetic component 162). The switching module is configured for providing two electrical signals with positive and negative polarities to the electromagnetic induction coil according to a switching timing. For example, the switch SW3 in this embodiment is connected in series with a current source 164a, and the switch SW4 is connected in series with another current source 164b with an opposite current direction relative to the current source 164a. The switches SW3 and SW4 are conducted alternatively according to a polarity signal POL for transmitting a current generated by the current source 164a or the current source 164b to the electromagnetic induction coil (i.e., the magnetic component 162), such that the magnetic component 162 establishes a first magnetic field $+B_0$ and a second magnetic field $-B_0$ in opposite directions according to the switching timing of the polarity signal POL (as shown in FIG. 4C).

Corresponding to aforesaid magnetic fields $+B_0$ and $-B_0$, the differential comparison circuit 144 of each sensing unit 142 shown in FIG. 4A receives the induction output voltages $V_H$ sensed respectively under the first magnetic field $+B_0$ and the second magnetic field $-B_0$ in sequence. The differential comparison circuit 144 also includes a switching module (which includes switches SW1 and SW2 in this embodiment). For example, each of the switches SW1 and SW2 in this embodiment is connected in series with an amplifier respectively, and the switches SW1 and SW2 are conducted alternatively according to a polarity signal POL.

The alternatively-conducted switches SW1 and SW2 are configured to separate the induction output voltages $V_H$ sensed under the first magnetic field $+B_0$ and the second magnetic field $-B_0$ in sequence, so as to form a first induction output voltage $V_{HO}$ and a second induction output voltage $V_{HE}$ respectively.

For example, the first magnetic field $+B_0$ and the second magnetic field $-B_0$ are generated respectively corresponding to odd frames and even frames of a display-driving timeline. The first induction output voltages $V_{HO}$ and the second induction output voltages $V_{HE}$ respectively correspond to the induction output voltages during the odd frames and the even frames.

Afterward, the differential comparison circuit 144 is configured to calculate a voltage differential value $V_D$ between the first induction output voltage $V_{HO}$ and the second induction output voltage $V_{HE}$ and compare the voltage differential value $V_D$ with a reference value $V_{REF}$ for determining a touch event, so as to determine if there is a touch event occur to the corresponding sensing unit 142. Based on the outcomes of all differential comparison circuits 144, which one of the sensing units 142 is correspondingly located at the touch position of the stylus can be determined.

If operations of sensing and determining are performed with the magnetic field in only one direction, the sensing units 142 will be susceptible to ambient magnetic fields (other than the magnetic field established by the stylus 160) in surrounding area. For example, when there is a relatively large ambient magnetic field along a specific direction around the touch-screen system 100, all of the sensing units 142 over the whole touch module 140 determine that there are touch events by mistake, such that the touch module 140 fails to detect the real position of the stylus 160.

In aforesaid embodiment with differential sensing and determining operations, each of the sensing unit 142 generates the first induction output voltage $V_{HO}$ and the second induction output voltage $V_{HE}$ sensed under the first magnetic field $+B_0$ or the second magnetic field $-B_0$ in sequence for following determinations. Based on differential determination, a deviation caused by the ambient magnetic filed along one specific direction can be avoided or reduced. The determination is performed according to both of the first magnetic field $+B_0$ and the second magnetic field $-B_0$ from the stylus 160, such that the accuracy of touch-sensing can be elevated.

In aforesaid embodiment, the touch module 140 further includes a timing control unit 146 and a communication unit 148. The stylus also includes another timing control unit 166 and another communication unit 168. The polarity signals POL on both sides of the touch module 140 and the stylus 160 are provided by the timing control units 146 and 166 on their own, and the timing control units 146 and 166 are synchronized to each other.

For example, referring to FIG. 4A to FIG. 4C, when the timing control unit 146 of the touch module 140 send the polarity signal POL to control the switches SW1 and SW2, the timing control unit 146 also sends a synchronization signal SYNC to the communication unit 148 at the same time. The communication unit 148 transmits the synchronization signal SYNC to the communication unit 168 of the stylus 160. The timing control unit 166 of the stylus generates the polarity signal POL according to the synchronization signal SYNC received by the communication unit 168.

It is noticed that the touch module 140 in the embodiment is integrated within the display panel 120, so as to reduce a total thickness of the touch-screen.

Figure 5:
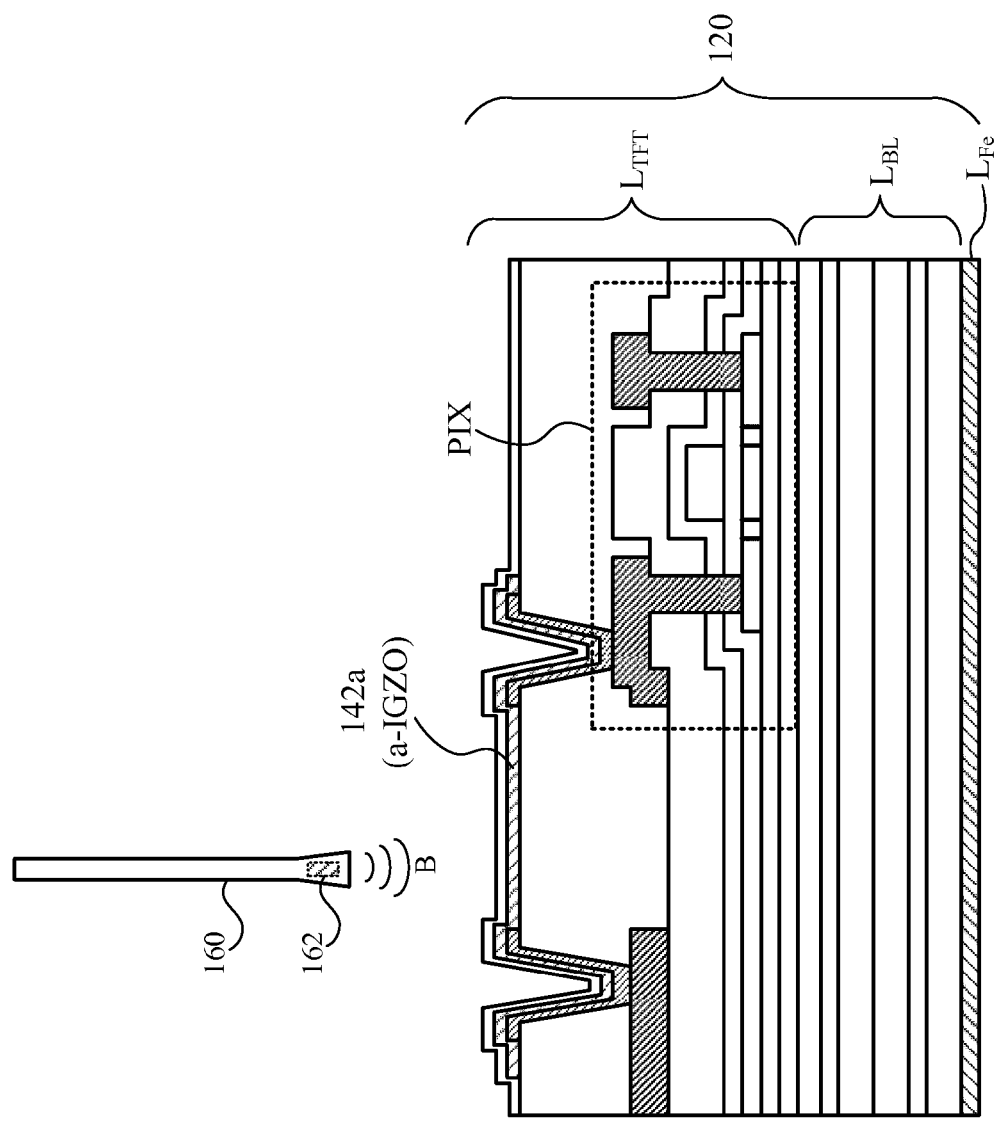
FIG. 5 is a sectional view illustrating the Hall induction plate integrated within the touch panel according to an embodiment of the disclosure.

Reference is made to FIG. 5, which is a sectional view illustrating the Hall induction plate 142a integrated within the touch panel 120 according to an embodiment of the disclosure. The display panel 120 includes a display-driving circuit layer $L_{TFT}$. In some embodiments, the display panel 120 further includes a backlight module layer $L_{BL}$ and a ferromagnetic material $L_{Fe}$. The Hall induction plate 142a of the touch module 140 is integrated within the display-driving circuit layer $L_{TFT}$ of the display panel 120.

The ferromagnetic material $L_{Fe}$ is disposed below the display-driving circuit layer $L_{TFT}$ and the backlight module layer $L_{BL}$. The ferromagnetic material $L_{Fe}$ is configured for stabilizing the direction of the magnetic field B established by the stylus 160, so as to ensure the magnetic field B penetrate the Hall induction plate 142a along a substantially vertical orientation.

FIG. 5 is a demonstrational diagram illustrating a display panel 120 adopting a Low-Temperature Poly-Silicon (LTPS) process. The display-driving circuit layer $L_{TFT}$ includes plural pixel transistors (one pixel transistor PIX is illustrated in FIG. 5 for demonstration). The Hall induction plates 142a of the touch module 140 are disposed at amorphous Indium-Gallium-Zinc-Oxide (a-IGZO) films above the pixel transistors PIX in the LTPS process, and the disclosure is not limited thereto.

Figure 6:
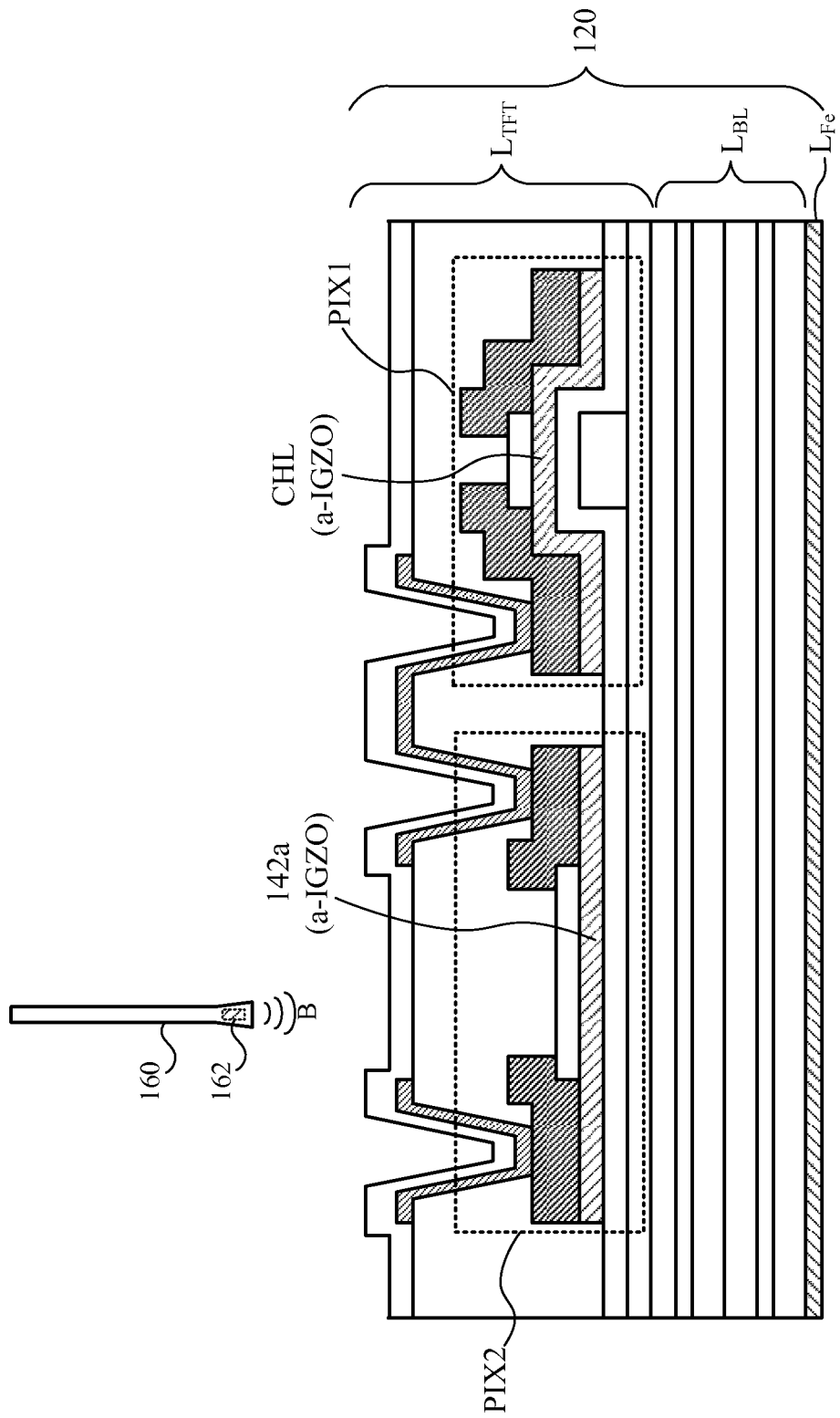
FIG. 6 is a schematic diagram illustrating the Hall induction plates disposed in a display panel according to another embodiment of the disclosure.

FIG. 6 is a schematic diagram illustrating the Hall induction plates disposed in a display panel according to another embodiment of the disclosure.

The display panel 120 shown in FIG. 6 includes a display-driving circuit layer $L_{TFT}$. In some embodiments, the display panel 120 further includes a backlight module layer $L_{BL}$ and a ferromagnetic material $L_{Fe}$. The Hall induction plate 142a of the touch module 140 is integrated within the display-driving circuit layer $L_{TFT}$ of the display panel 120.

In addition, FIG. 6 is a demonstrational diagram illustrating a display panel 120 adopting an amorphous Indium-Gallium-Zinc Oxide (a-IGZO) process. The display-driving circuit layer $L_{TFT}$ includes plural pixel transistors (two pixel transistors PIX1, PIX2 are illustrated in FIG. 6 for demonstration). The Hall induction plates 142a of the touch module 140 are disposed at an amorphous Indium-Gallium-Zinc Oxide (a-IGZO) films between source electrodes and drain electrodes of the pixel transistors (e.g., the pixel transistor PIX2 shown in FIG. 6) in a Low-Temperature Poly-Silicon (LTPS) process. The a-IGZO film on another pixel transistor PIX1 is utilized as a channel layer CHL within the pixel transistor PIX1.

According to aforesaid embodiments, the disclosure provides a touch-screen system and a display panel with touch-sensing function. At least one part of the touch module is integrated within a display-driving circuit of the display panel. A touch module include a Hall induction plate for sensing a variance of an external magnetic (e.g., a magnetic field established by a stylus), so as to elevate the accuracy in determining a touch event.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A touch-screen system, comprising: a stylus, comprising a magnetic component; a display panel; and a touch module, disposed within the display panel, the touch module comprising a plurality of sensing units distributed at different positions in an array arrangement on the display panel, each of the sensing units comprising a Hall induction plate for sensing a magnetic field established by the magnetic component and forming an induction output voltage respectively, the touch module detecting a touch position of the stylus according to the induction output voltages, wherein each of the sensing units further comprises a power signal source, a first switch, a second switch and a signal amplifier, the first switch is coupled between the power signal source and the Hall induction plate, the second switch is coupled between the Hall induction plate and the signal amplifier, during a first time interval, the first switch is conducted and the power signal source provide a plurality of free charges to the Hall induction plate, the Hall induction plate senses the magnetic field established by the magnetic component and forms an induction voltage difference, the induction voltage difference is processed by the signal amplifier to form the induction output voltage, and during a second time interval after the first time interval, the second switch is conducted to output the induction output voltage.

2. The touch-screen system of claim 1, wherein the magnetic component comprises an electromagnetic induction coil, the stylus further comprises a switching module coupled with the electromagnetic induction coil, the switching module is configured for providing two electrical signals with positive and negative polarities to the electromagnetic induction coil according to a switching timing, such that the magnetic component establishes a first magnetic field and a second magnetic field in opposite directions according to the switching timing.

3. The touch-screen system of claim 2, wherein each of the Hall induction plates senses the first magnetic field and the second magnetic field established by the magnetic component and forms a first induction output voltage and a second induction output voltage respectively, the touch module comprises a differential comparison circuit for calculating a voltage differential value between the first induction output voltage and the second induction output voltage and comparing the voltage differential value with a reference value, so as to determine which one of the Hall induction plates is correspondingly located at the touch position of the stylus.

4. The touch-screen system of claim 1, wherein the display panel comprises a display-driving circuit layer, the Hall induction plates are integrated within the display-driving circuit layer.

5. The touch-screen system of claim 4, wherein the display-driving circuit layer comprises a plurality of pixel transistors, the Hall induction plates of the touch module are disposed at amorphous Indium-Gallium-Zinc-Oxide (a-IGZO) films above the pixel transistors in a Low-Temperature Poly-Silicon (LTPS) process.

6. The touch-screen system of claim 4, wherein the display-driving circuit layer comprises a plurality of pixel transistors, the Hall induction plates of the touch module are disposed at amorphous Indium-Gallium-Zinc-Oxide (a-IGZO) films between source electrodes and drain electrodes of the pixel transistors in a Low-Temperature Poly-Silicon (LTPS) process.

7. The touch-screen system of claim 4, wherein the display panel further comprises a ferromagnetic material layer disposed below the display-driving circuit layer.

8. A display panel with touch-sensing function, capable of detecting a touch position of a stylus, the stylus comprising a magnetic component, the display panel comprising: a display-driving circuit layer; and a touch module, integrated within the display-driving circuit layer, the touch module comprising a plurality of sensing units distributed at different positions in an array arrangement on the display panel, each of the sensing units comprising a Hall induction plate for sensing a magnetic field established by the magnetic component and forming an induction output voltage respectively, the touch module detecting a touch position of the stylus according to the induction output voltages, wherein each of the sensing units further comprises a power signal source, a first switch, a second switch and a signal amplifier, the first switch is coupled between the power signal source and the Hall induction plate, the second switch is coupled between the Hall induction plate and the signal amplifier, during a first time interval, the first switch is conducted and the power signal source provide a plurality of free charges to the Hall induction plate, the Hall induction plate senses the magnetic field established by the magnetic component and forms an induction voltage difference, the induction voltage difference is processed by the signal amplifier to form the induction output voltage, and during a second time interval after the first time interval, the second switch is conducted to output the induction output voltage.

9. The display panel of claim 8, wherein the display-driving circuit layer comprises a plurality of pixel transistors, the Hall induction plates of the touch module are disposed at amorphous Indium-Gallium-Zinc-Oxide (a-IGZO) films above the pixel transistors in a Low-Temperature Poly-Silicon (LTPS) process.

10. The display panel of claim 8, wherein the display-driving circuit layer comprises a plurality of pixel transistors, the Hall induction plates of the touch module are disposed at amorphous Indium-Gallium-Zinc-Oxide (a-IGZO) films between source electrodes and drain electrodes of the pixel transistors in a Low-Temperature Poly-Silicon (LTPS) process.

11. The display panel of claim 8, wherein the display panel further comprises a ferromagnetic material layer disposed below the display-driving circuit layer.

* * * * *